April 20, 1926.
W. H. GRIFFITHS
1,582,003
BABY SOOTHER
Filed Oct. 12, 1922
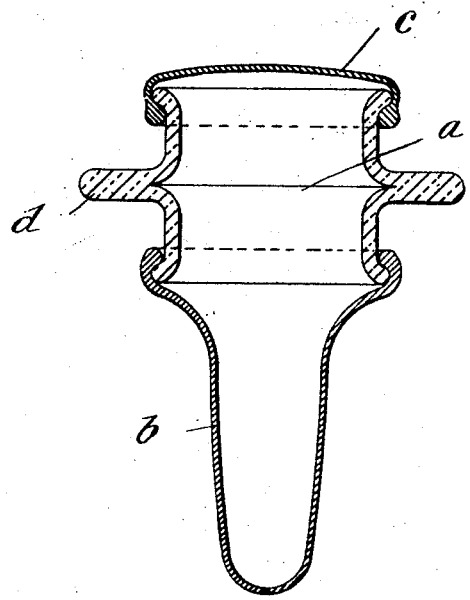
INVENTOR.
WILLIAM HARRY GRIFFITHS
ATTORNEYS.

Patented Apr. 20, 1926.

1,582,003

UNITED STATES PATENT OFFICE.

WILLIAM HARRY GRIFFITHS, OF HEREFORD, ENGLAND.

BABY SOOTHER.

Application filed October 12, 1922. Serial No. 594,421.

*To all whom it may concern:*

Be it known that I, WILLIAM HARRY GRIFFITHS, a subject of the King of Great Britain, residing at Hereford, England, have invented certain new and useful Improvements in Baby Soothers, of which the following is a specification.

The present invention relates to an improved baby comforter or soother arranged to enable an infant to draw from it by the natural action of sucking, a palatable and preferably nutritious substance such as a sweet syrupy secretion or liquid, for example, honey or golden syrup.

The invention relates to that type of soothing teat comprising a hollow stem or tube for receiving a supply of the desired substance and having at one end a perforated rubber teat and at the other end a removable closure, the usual detachable safety ring or disc being provided on the teat, or on the hollow tube, for preventing the soothing teat from passing too far into the infant's mouth.

According to the present invention there is provided an improved construction of soothing teat of the foregoing type which as shown on an enlarged scale in the accompanying drawing comprises a tube $a$ having a safety disc or ring $d$ formed integrally therewith, the tube at one end being adapted for the attachment of the usual perforated rubber teat $b$ and at the other end being adapted for an overlapping beaded closure by a rubber cap $c$. Thus the tube $a$ and the safety disc or ring $d$ constitute a unit component in the assemblage of the components forming the soother.

The tube $a$ and safety disc $d$ may be made of any suitable material. In the illustration the tube and disc component is represented as made of glass. Glass or a similar material is eminently suited for the moulding or casting of the tube and disc in one piece.

The tube may conveniently and advantageously be of a capacity to hold a teaspoonful or thereabouts of honey or other syrup or similar substance, such as a dose of honey or the like serving to comfort and sooth the infant for some appreciable time.

What I claim is:

A baby soother comprising a safety disc provided with a large central opening and marginal flanges outstanding from the opposite sides of the disc about the opening therethrough and forming with the disc an open ended receptacle, a perforated teat mounted on one of said flanges at one side of the disc, and a removable closure mounted on the other flange at the opposite side of the disc.

In testimony whereof, I affix my signature.

WILLIAM HARRY GRIFFITHS.